(12) United States Patent
Wilczek (10) Patent No.: US 10,963,904 B2
(45) Date of Patent: Mar. 30, 2021

(54) AUTOMATIC SENDING OF DIGITAL DOCUMENTS TO IDENTIFIED DESTINATIONS

(71) Applicant: Coupa Software Incorporated, San Mateo, CA (US)

(72) Inventor: Donna Wilczek, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 287 days.

(21) Appl. No.: 15/894,892

(22) Filed: Feb. 12, 2018

(65) Prior Publication Data

US 2018/0268433 A1 Sep. 20, 2018

Related U.S. Application Data

(60) Provisional application No. 62/471,280, filed on Mar. 14, 2017.

(51) Int. Cl.
| | |
|---|---|
| *G06Q 30/02* | (2012.01) |
| *G06Q 30/04* | (2012.01) |
| *H04L 12/58* | (2006.01) |
| *H04L 29/06* | (2006.01) |
| *H04L 29/08* | (2006.01) |

(52) U.S. Cl.
CPC ..... *G06Q 30/0235* (2013.01); *G06Q 30/0215* (2013.01); *G06Q 30/04* (2013.01); *H04L 51/14* (2013.01); *H04L 51/08* (2013.01); *H04L 51/18* (2013.01); *H04L 67/02* (2013.01); *H04L 67/06* (2013.01); *H04L 67/42* (2013.01)

(58) Field of Classification Search
CPC . G06Q 30/0235; G06Q 30/0215; G06Q 30/04
USPC .................................................... 705/14.17
See application file for complete search history.

(56) References Cited

U.S. PATENT DOCUMENTS

| | | | | |
|---|---|---|---|---|
| 7,676,407 | B2 * | 3/2010 | Van De Van | G06Q 20/102 705/30 |
| 2012/0116969 | A1 * | 5/2012 | Kumar | G06F 21/41 705/42 |
| 2015/0142545 | A1 * | 5/2015 | Ceribelli | G06Q 30/0222 705/14.23 |

* cited by examiner

*Primary Examiner* — Azam A Ansari
(74) *Attorney, Agent, or Firm* — Baker Botts L.L.P.

(57) ABSTRACT

Systems and methods are provided for automatically sending an electronic digital document to a second destination in response to determining that a user associated with a first destination is unable to act on an action associated with the document. In an embodiment, a digital processing system receives a first document through a procurement management system along with digital data identifying a first destination account for the first document. The digital processing system generates a message to a first destination account in order to send the first document and a first prompt including a selectable option for a recipient to identify whether the recipient is capable of acting upon the document. When a selection is received indicating that the recipient is not capable of acting upon the document, a second prompt is displayed requesting input of a second destination to receive the document. In response to receiving an identification of the second destination, the digital processing system automatically sends the document to the second destination.

14 Claims, 5 Drawing Sheets

AUTOMATIC SENDING OF DIGITAL DOCUMENTS TO IDENTIFIED DESTINATIONS

BENEFIT CLAIM

This application claims the benefit of Provisional Application 62/471,280, filed Mar. 14, 2017, the entire contents of which is hereby incorporated by reference as if fully set forth herein, under 35 U.S.C. § 119(e).

FIELD OF THE INVENTION

The present disclosure relates to digital processing systems executing procurement management applications. Specifically, the present disclosure relates to automatically sending digital electronic documents to a plurality of computing devices through a procurement management application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Procurement management applications are useful for allowing large enterprises to produce work orders, generate invoices, process payments, and generally manage day-to-day operations. A procurement management application may automatically generate invoices based on received work orders. Additionally, a procurement management application may allow a vendor to generate an invoice to be sent to a user account of a procurement management system associated with a particular enterprise.

Benefits of a procurement management system include the ability to ensure receipt of an invoice by the correct entity. This allows vendors to generate time-limited early payment discount offers for particular invoices. A time-limited early payment discount offer generally includes a payment amount that is lower than the invoiced amount which is offered in exchange for payment of the invoice prior to an offer timestamp.

Unfortunately, despite numerous safeguards, often times an invoice is sent to the wrong account. This may occur if the person who requests the service within a particular entity is not the person who is authorized to actually process invoices for the particular entity. If the vendor has only interacted with the person who requested the service, the vendor would have no way of knowing that the requestor is not the correct recipient of the invoice. This can also occur if the procurement management system incorrectly identifies a recipient for the invoice, such as by using information within a work order.

If a user receives an invoice through the procurement management system that the user cannot process, remedial measures become time consuming. Generally, a user would have to save the invoice, identify the personnel in the company capable of handling the invoice, and find a method outside of the procurement management system for sending the invoice to the correct personnel. As this process is time-consuming, many users will tend to not act on an incorrectly received invoice. Alternatively, a user may just take a long time to get the invoice to the correct personnel.

Slowdowns in the processing of invoices can negatively affect both the beneficiary of the invoice and the payer of the invoice. The beneficiary suffers by not being able to access the funds that would be received by earlier payment of the invoice. The payer of the invoice suffers by not being able to take advantage of the time-limited early payment discount offer, thereby increasing the cost of the services to the enterprise.

Therefore, there is a need for a system that ensures the recipient of a document is capable of acting on the document. Additionally, there is a need for a system that can quickly determine when a recipient of a document is unable to act on the document and to, in response to determining that the recipient is unable to act on the document, ensure that the document is sent to a recipient that is capable of acting on the document.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

A method is provided for automatically sending a document to a second computing device in response to determining that a first computing device is unable to act upon an action associated with the document. According to an embodiment, a digital processing system receives a digital document along with an identification of an action and an action timestamp. The digital processing system sends the document through a procurement management system to a first computing device associated with a first account along with a selectable option for indicating whether the recipient of the document is capable of acting upon an action associated with the document. In response to receiving an indication that the recipient is unable to act upon the action, the digital processing system requests identification of a second account to receive the document. In response to receiving an identification of a second account, the digital processing system sends the document to the second account.

In an embodiment, a method comprises: receiving, at a first computer system executing a procurement management system, a first digital electronic document and digital data identifying, for the first digital electronic document, a first destination account of the procurement management system; generating, at the first computer system, through the procurement management system, a message to the first destination account, the message comprising the first digital electronic document and a selectable option indicating that the first destination account cannot act upon an action that is associated with the first digital electronic document; wherein a selection of the selectable option indicating that the first destination account cannot act upon the action that is associated with the first digital electronic document causes a second computer system to display a request through the procurement management system to input a second destination account that is capable of acting upon the action that is associated with the first digital electronic document; receiving, at the first computer system, account identifying data indicating a selection of the selectable option and an address of the second destination account; automatically sending, from the first computer system to the second destination account, a message comprising the first digital electronic document.

System Overview

Figure 1:
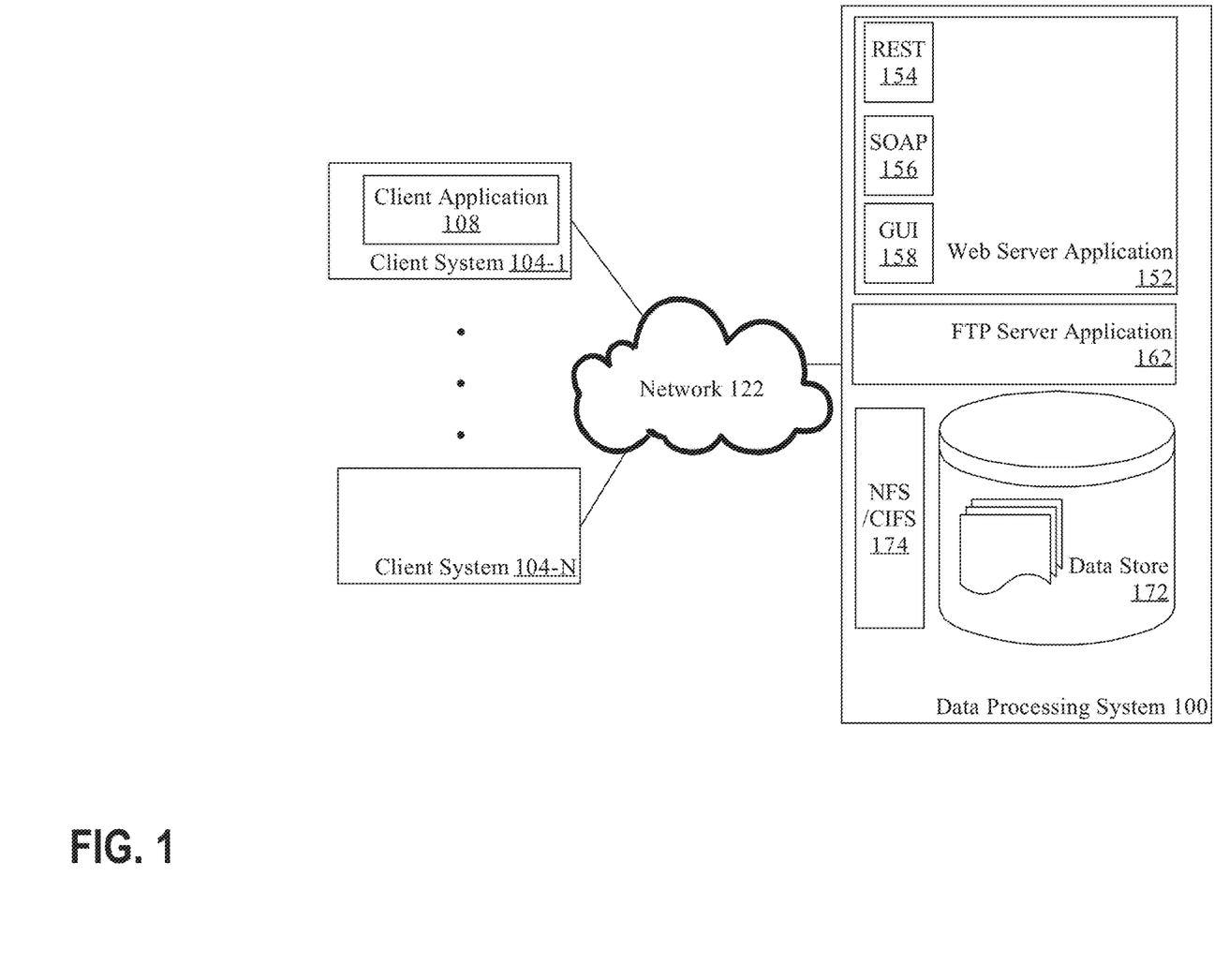
FIG. 1 illustrates an example operating environment upon which an embodiment may be implemented.

FIG. 1 illustrates an example operating environment upon which an embodiment may be implemented. In FIG. 1, data processing system (DPS) 100 may comprise one or computer systems that are coupled using network 122 to one or more client systems 104-1, 104-N. Any number of client systems 104-1, 104-N may be deployed in a distributed computing system of this type, as indicated by the designation "N" in 104-N. DPS 100 and client systems 104-1, 104-N may be in two or more different locations such as different states, countries or other geographical or political units.

The DPS 100 hosts, executes or comprises a web server application 152, FTP server application 162, file system 174 and data store 172. In an embodiment, web server application 152 implements a client-server business application, such as a procurement management system, in communication with compatible instances of a client application 108 that are hosted at the client systems 104-1, 104-N. The web server application 152 may include a Representational State Transfer (REST) interface 154, Simple Object Access Protocol (SOAP) interface 156, and presentation layer or graphical user interface (GUI) 158. The GUI 158 may be programmed to generate HTML documents, vector data, or other data that can be displayed or rendered at the client systems 104-1, 104-N to cause visually displaying data, images, text and the like representing prompts, GUI widgets, output data, reports and the like as part of the business application.

Network 122 broadly represents a digital data telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, client system 104-1 establishes a connection with DPS 100 using one or more protocols to receive one or more documents from DPS 100. One technique to transmit a document is for client system 104-1 to download a file containing the document from DPS 100. For example, DPS 100 may store one or more documents in data store 172. Client system 104-1 may use client application 108 to access the file over FTP protocol through FTP server application 162. Upon receipt of the file, client system 104-1 may store the document file in memory of client system 104-1.

In another embodiment, DPS 100 may expose one or more of its directories coupled to data store 172 through a network file system such as NFS/CIFS 174. Client system 104-1 may mount the network directory using client application 108 and retrieve a document file from the mounted directory. The transfer would trigger transmission of a copy of the document file over network 122 from the mounted directory in data store 172.

In yet another embodiment, client application 108 is a web browser which is used by a user of client computer system 104-1 to display graphical user interface 158 of web server application 152 of DPS 100. Through GUI 158, DPS 100 may transmit a message to client application 108 containing the document and request web server application 152 to initiate the transmission. The request triggers DPS 100 to transmit the file using HTTP(s) (Hyper-Text Transfer Protocol) to client application 108 through web server application 152.

Alternatively or additionally, DPS 100 may transmit a document to client computer system 104-1 through a programming interface of DPS 100. In such an embodiment, client computer system 104-1 connects to DPS 100 using the protocol used by the programming interface and DPS 100 transmits the document using the protocol. For example, DPS 100 may use SOAP 156 or REST 154 over HTTP(s) to transmit a document to client application 108 of client computer system 104-1.

Time Limited Offer Generation

In an embodiment, DPS 100 generates one or more documents to be sent to a client computing device. For example, DPS 100 may be programmed or configured to generate work orders, invoices, and/or offers based on input data. DPS 100 may receive data identifying a description of a product, a shipping address, a supplier of the product, and a base price of the product. DPS 100 may supplement the product information with an invoice number, invoice data, additional terms, and taxes. DPS 100 may then compile the information into an invoice document to be sent to a client computing device. Additionally and/or alternatively, DPS 100 may receive the document from an outside source. For example, a client computing device may send an invoice over network 122 to DPS 100 with a request to send the invoice to one or more destination computing devices.

In an embodiment, DPS 100 additionally identifies an action that can be taken with respect to the document and an action timestamp which indicates a time by which the action must be performed. As an example, an invoice may be accompanied by a time limited offer which identifies a reduced price of an invoice if the invoice is paid by a date and time identified by the action timestamp. As another example, a coupon for one or more goods and/or services may be accompanied by a coupon end date timestamp which indicates a date and time after which the coupon is no longer valid.

The identification of an action and the action timestamp may be contained within the document and/or stored as metadata of the document. For example, an invoice may include a line at the bottom identifying an early payment discount offer with a reduced price for goods and/or services identified by the invoice. Additionally, the document may include metadata identifying that the document contains an early payment discount offer and metadata identifying the timestamp associated with the early payment discount offer.

Additionally and/or alternatively, DPS 100 may store data identifying the action and the action timestamp separately from the document. For example, DPS 100 may store a table in data store 172 identifying a plurality of documents associated with particular actions and action timestamps for the plurality of documents. In an embodiment, DPS 100 periodically updates the table to indicate which action timestamps have already passed, thereby allowing faster identification of lapsed offers.

Automatic Sending

Figure 2:
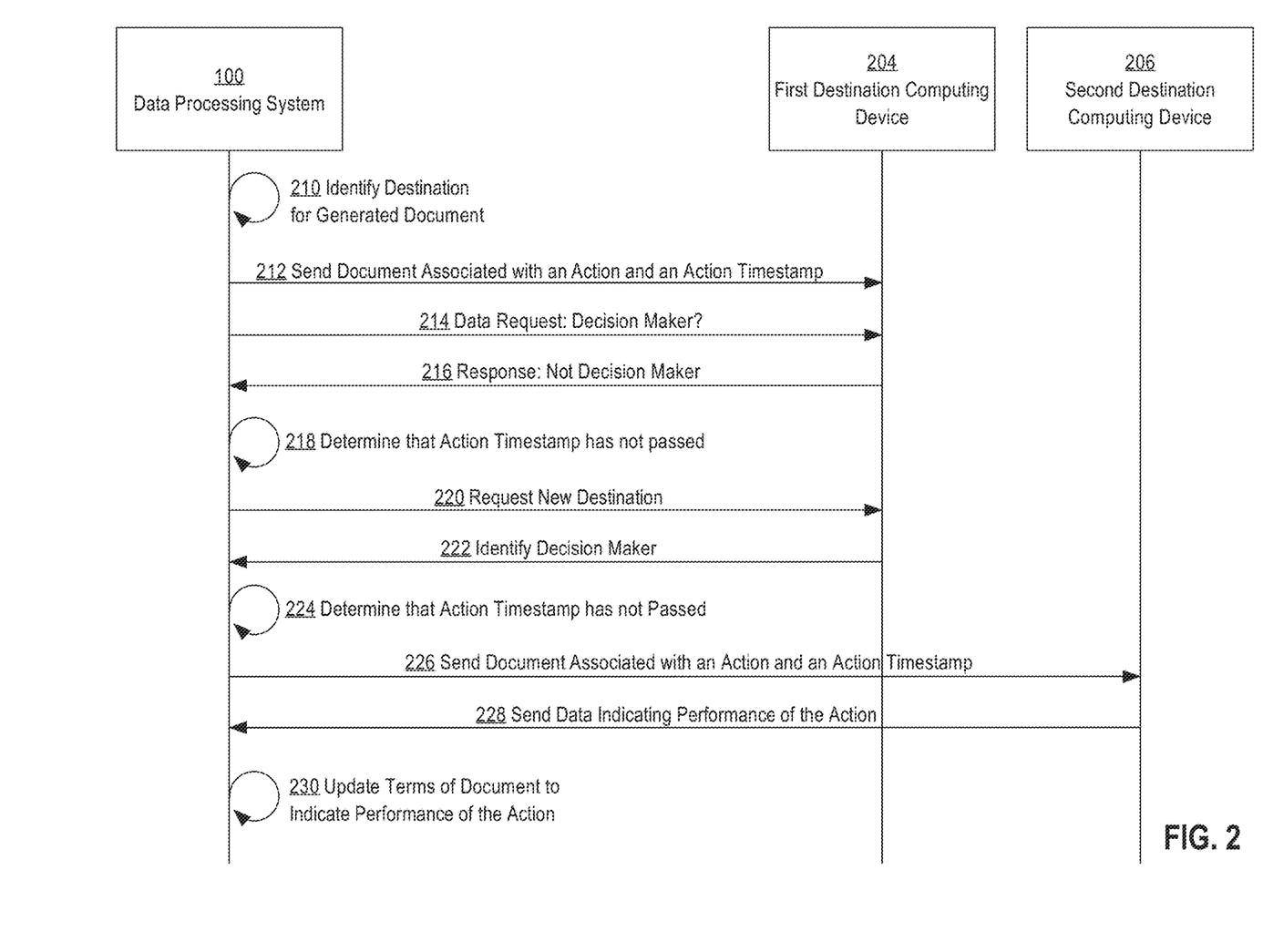
FIG. 2 is a message diagram depicting an implementation of a method of presenting a time limited offer through a data processing system.

FIG. 2 is a message diagram depicting an implementation of a method of presenting a time limited offer through a data processing system. While many of the examples provided herein refer to the use of invoices, embodiments may be performed using the methods described herein for automatic sending of any type of document associated with a time limited action.

Referring to FIG. 2, at step 210, a data processing system (DPS) identifies a destination for a generated document. Destinations, as used herein, may refer to one or more accounts of a user profile of a procurement management system and/or one or more messaging accounts, such as an email account, of one or more users. For example, DPS 100 may store data identifying a plurality of user profiles of the procurement management system. When a user of client computer system 104-1 accesses client application 108, the user may enter authentication information, such as a username and password, to access data related to a particular user profile, such as received documents and messages. Additionally and/or alternatively, DPS 100 may store data identifying external messaging accounts for participants of particular organizations. For example, DPS 100 may store email addresses of identified contacts for a particular organization.

In an embodiment, DPS 100 receives the first destination for the document along with the document. For example, a user may upload an invoice to DPS 100 to be sent to one or more destinations. The user may manually select user profiles of the procurement management system and/or designate an external contact for the document, such as an email address, through a user interface executing on a client computing device.

According to an embodiment, DPS 100 identifies destinations based on data used to generate the document. For example, a first user profile may generate a work order through the procurement management system. DPS 100 may generate an invoice from the work order and identify the first user profile as the destination account for the invoice. Additionally and/or alternatively, the first user profile may specify the destination for a generated work order.

In an embodiment, DPS 100 identifies destinations based on stored entity data. For example, a first user profile may be associated with a first entity. If the first user profile generates a work order, DPS 100 may generate an invoice from the work and identify one or more destination profiles that are also associated with the entity. Thus, if the first entity has an "accounting" profile that is set up to receive invoices, DPS 100 may send any invoices directed to the first entity to the "accounting" profile. As another example, a client computing device may specify a particular entity to receive an invoice sent to DPS 100. DPS 100 may then identify the profile associated with the entity to receive the invoice.

In an embodiment, DPS 100 dynamically identifies destination accounts based on stored data. For example, a particular entity may be associated with a plurality of profiles, but none of the plurality of profiles may be set up to receive invoices. DPS 100, may access an ordered list of destinations associated with the particular entity which orders destinations based on priority for receiving invoices. The destinations may be ordered based on position in the company or past records of invoice payment. For example, the first entry on the ordered list may be a user profile which has processed the most invoices for the particular entity. Each subsequent entry may be a user profile which has processed the next most invoices for the particular entity, and so on. As another example, the first entry on the ordered list may be an administrator profile which controls permissions for the other profiles. The next entry may be the profile with the next most permissions granted, and so on.

Additionally and/or alternatively, DPS 100 may access a list of destinations and determine which destination would be the most appropriate to receive the document. For example, DPS 100 may base the identification of a destination on information regarding the invoice itself. Using information from the invoice allows DPS 100 to target destinations based on a perceived likelihood that the recipient of the invoice is someone in a position of power to handle the invoice. For example, if an entity has a plurality of departments, DPS 100 may identify a department listed on the invoice and/or associated with the profile of the user that generated the invoice. DPS 100 may then identify the destination that has been selected to receive invoices for the department. Additionally and/or alternatively, DPS 100 may identify destinations that have handled the largest number of invoices for the particular department.

Referring again to FIG. 2, at step 212, the DPS sends a document associated with an action and an action timestamp to a first destination computing device. For example DPS 100 may send an invoice with a time limited early payment offer to first destination computing device 204. Sending the document to the first destination computing device may include providing the document through a web server application, an FTP server application, and/or an external messaging system such as email. In an embodiment, the document may include data identifying the action and the action timestamp. Additionally and/or alternatively, a message may identify the action and the action timestamp associated with the document. As an example, a message may indicate that there is a time limited early payment offer which, if accepted, reduces the payment price on an attached invoice from a first payment amount to a reduced second payment amount.

At step 214, the DPS sends a data request to the first destination computing device to determine if the first destination computing device is a decision maker for the first document. In an embodiment, the data request is a selectable option that is included in the message with the first document. For example, the message may contain the question "Are you a decision maker for this document?" with hyperlinks for the answers "yes" and "no." Selection of the hyperlink for "yes" may cause the client computing device to send data to DPS 100 indicating that a user associated with the first destination computing device is able to act upon the action associated with the document. For example, the hyperlink may connect to a unique URL for a website hosted by the DPS. Thus, if an invoice is sent to an accountant who is capable of paying the invoice, the accountant may select "yes." On the other hand, if an invoice is sent to a profile or email of a user who created the work order but is not authorized to pay the invoice, the user may select "no."

In an embodiment, the data request to the first destination computing device includes a modal window that is displayed when the recipient views the message. For example, a procurement management application executing on the first destination device may be configured to display a notification through a modal window when the user views a message with an invoice and a time limited offer. As another example, the procurement management system may interact with one or more application programing interfaces (APIs) of one or more messaging applications in order to cause a pop-up notification to be displayed through the one or more messaging application.

Figure 3A:
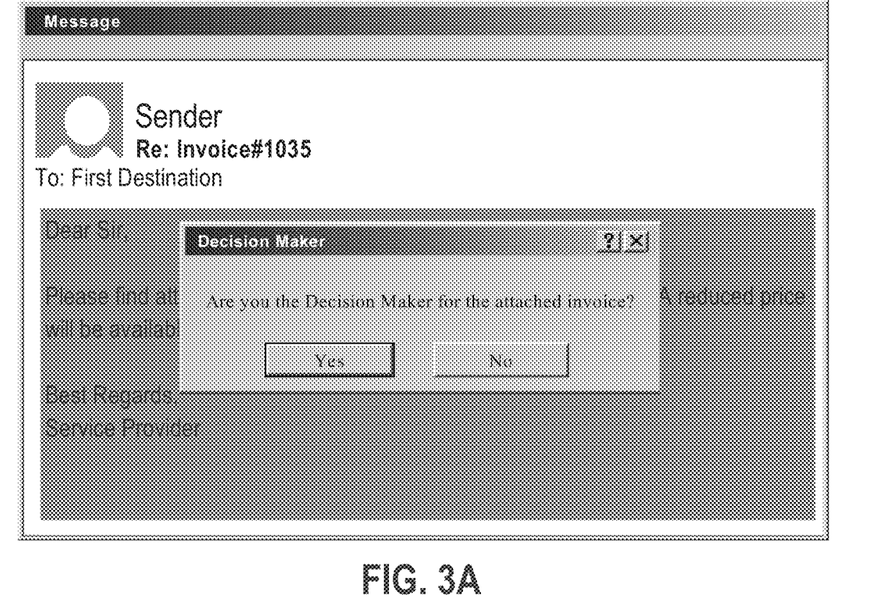
FIG. 3A depicts an example interface for displaying the decision maker data request as a modal window over a message.

FIG. 3A depicts an example interface for displaying the decision maker data request as a modal window over a message. In the example interface, the modal window prompts a user to select either "Yes" to indicate that the user is a decision maker for the document or "No" to indicate that the user is not a decision maker for the document. As shown in FIG. 3A, in an embodiment, the rest of the invoice message may be altered, such as grayed out, until a selection is made indicating whether the user is a decision maker for the document.

At step 216, the DPS receives a response from the first destination computing device indicating that the first destination computing device is not a decision maker for the first document. For example, in response to receiving a selection of "No" through the window depicted in FIG. 3A, the first destination computing device may send data to DPS 100 indicating that the "No" option was selected.

Additionally and/or alternatively, the DPS may receive the response from the first destination computing device along with the identification of the decision maker that is sent at step 222. For example, the application executing on the first destination computing device may be programmed or configured to display the data request of step 220 in response to receiving a selection of the "No" option. The client computing device may then send data to DPS 100 indicating the selection of the "No" response along with the identification of the decision maker that is generated at step 222.

At step 218, the DPS determines that the action timestamp has not passed. For example, in response to receiving the indication that the user of the first destination computing device is unable to act on the action, DPS 100 may compare the action timestamp with a then-current timestamp. The then-current timestamp may be supplied by a system clock running on DPS 100. If DPS 100 determines that the then-current timestamp is after the action timestamp, DPS 100 may update data records to indicate that the user of first destination computing device was not the "Decision Maker" for the document. On the other hand, as the time limited offer has lapsed, DPS 100 may be programmed or configured to not continue with steps 220-228 if the action timestamp has passed.

In an embodiment, in response to determining that the action timestamp has passed, DPS 100 removes the data identifying the action and action timestamp from the document and/or the message. For example, DPS 100 may generate a new invoice that contains the initial payment amount term, but does not contain the time limited early payment discount offer. Additionally and/or alternatively, DPS 100 may identify in the document that the action timestamp has passed. For example, a second payment amount associated with the time limited early payment discount offer may be crossed out as an indication that the offer has lapsed. Additionally, DPS 100 may remove any metadata identifying the time limited early payment discount offer from the document and/or update stored data records to indicate that the time limited early payment discount offer has lapsed. By updating the metadata/data records, DPS 100 is able to avoid making the same determination multiple times.

In an embodiment, in response to determining that the action timestamp has passed, DPS 100 places the document into a separate processing queue. For example, in order to increase the likelihood of performance of the action, DPS 100 may place documents with an action and action timestamp into an expedited processing queue. Documents in the expedited processing queue may receive earlier processing, such as earlier sending to other destinations. If DPS 100 determines that the action timestamp has passed, the document may be removed from the expedited processing queue so that documents with actions that are still actionable may be processed first.

In embodiments where the first destination computing device performs step 220 prior to step 216, i.e. when the first destination computing device requests the decision maker in response to receiving a selection of the "No" option without communicating with DPS 100, the first destination computing device may perform step 218. If the first destination computing device determines that the action timestamp has passed, the first destination computing device may data to DPS 100 indicating that the action timestamp has passed. Additionally and/or alternatively, the first destination computing device may update the prompt for step 220 to request a different destination computing device for future documents. Alternatively, step 218 may be omitted in some embodiments.

At step 220, the DPS requests a new destination from the first destination computing device. For example, DPS 100 may send a message to first destination computing device 204 through a web server application, an FTP server application, and/or an external messaging system such as email. The message may request input of identifications of one or more destinations to send the document with the data identifying the action and action timestamp. Additionally and/or alternatively, the selectable option to indicate that the user of the first destination device is unable to act upon the action may cause the first destination computing device to execute a browser application and navigate to a URL associated with the message. DPS 100 may detect that the first destination computing device accessed the URL and cause displaying, on a webpage identified by the URL, a request for identification of additional destinations.

In an embodiment, the first destination computing device causes displaying of a notification requesting a new destination in response to either the selection of the selectable option indicating that the user is not able to act upon the action associated with the document or a determination that the action timestamp has not passed. For example, if the user selects the "No" option of the user interface in FIG. 3A, first destination computing device 204 may optionally determine that the action timestamp has not passed before displaying a new modal window requesting a new destination computing device.

Figure 3B:
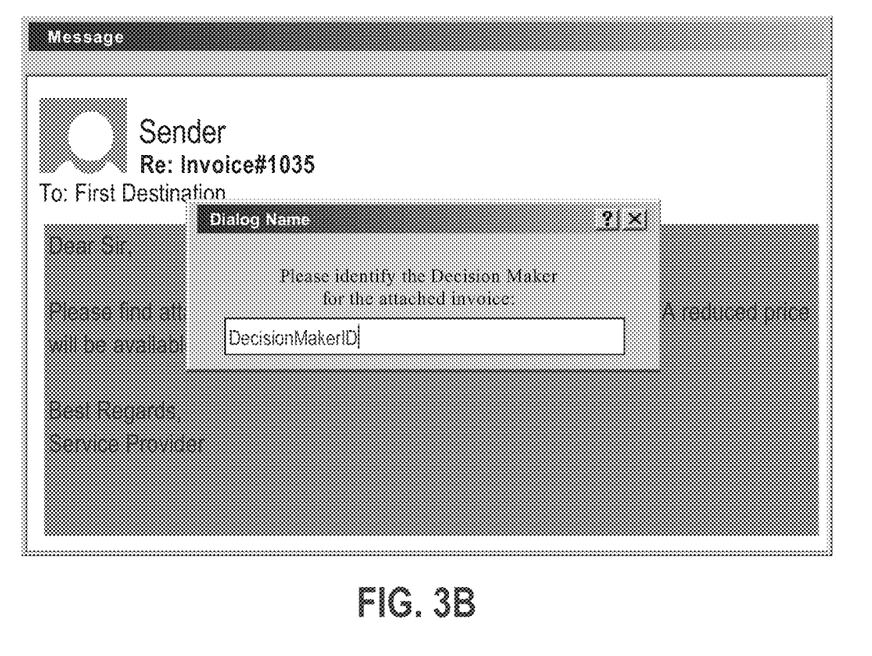
FIG. 3B depicts an example interface for displaying a request for identification of the decision maker through a modal window.

FIG. 3B depicts an example interface for displaying a request for identification of the decision maker through a modal window. In the example of FIG. 3B, the modal window requests text input identifying the new destination. In the example of a procurement management system, the modal window may request a username of an account associated with the decision maker for the document. Additionally and/or alternatively, the modal window make request an email address or other external contact for the decision maker.

In an embodiment, the request for identification of the decision maker includes an ordered list of possible destination accounts. The ordered list may include a plurality of destination accounts that are associated with the particular document. For example, each account of a procurement management system may specify a managing entity for the account, such as a business that employs the user of the account. DPS 100 may be programmed or configured to include in the ordered list other accounts associated with the managing entity. The ordered list may also include destination accounts identified at the generation of the document. For example, if user specifies three possible destinations for a document, DPS 100 may send the document to the first identified destination. If DPS 100 receives a selection of the selectable option indicating that the user cannot act upon the document, DPS 100 may display the other two destinations along with a request to identify which of the other two destinations is able to act upon the document.

The list of possible destination accounts may be ordered by a likelihood that a user of the destination account is able to act on the action. For example, DPS 100 may store data indicating which accounts for a particular entity process generated invoices. DPS 100 may order the accounts for the particular entity by a number of invoices processed and/or a percentage of invoices received by the account that were processed by the account. Additionally and/or alternatively, DPS 100 may store data indicating, for a particular destination accounts, which accounts the particular destination account has identified in previous iterations of the method as the "Decision Maker" for the document. DPS 100 may include the most frequently identified accounts for the particular destination at the top of the list.

In an embodiment, the request for identification of the decision maker includes an identification of a next account on an ordered list of destinations. For example, an ordered list of destination accounts may include each account identified by the creator of the document ordered by a computed likelihood of the user being able to act upon the offer. If a selection is made by the user of the first destination account indicating that the user is unable to act upon the document, a message may be displayed on the first destination computing device requesting confirmation that the next destination account is able to act upon the document. For example, a message may state "Is User 2065 a Decision Maker for the attached invoice?" with selectable options for "Yes" and "No."

In an embodiment, DPS 100 identifies an account other than the next account on the ordered list of destinations. For example, DPS 100 may order the list of destinations based on a first criteria, but determine that a different destination should be identified based on a second criteria. Thus, if the first criteria is based on past processing of invoices and the second criteria is that the destination was identified at the generation of a work order, even if a third destination historically processes the most invoices and is therefore at the top of the list, DPS 100 may still select the second destination due to the fact that the second destination was identified during the creation of the work order. As another example of an override, the second destination may be selected due to being the most selected destination by the first destination even if the second destination rarely processes received invoices.

At step 222, the first destination computing device identifies a decision maker to the DPS. As noted above, the first destination computing device may receive text input identifying the second destination, a selection of the second destination from a list of destinations, and/or a confirmation that a next displayed destination is the correct destination for the document. First destination computing device 204 may send the data identifying the correct decision maker or decision makers, in the case of multiple selections, to DPS 100.

In an embodiment, DPS 100 stores data identifying one or more of the document type, the first destination, the identified second destination, or the data used to identify the first destination. DPS 100 may use the stored data to increase the effectiveness with which DPS 100 identifies destinations. For example, if DPS 100 stores data indicating that the first destination device has sent every received document to the second destination device, DPS 100 may bypass sending the document to the first destination device in favor of the second destination device. As another example, DPS 100 may identify destinations for a particular entity that tend to have documents sent to them. DPS 100 may include the identified destinations as suggestions for the "Decision Maker" for future documents.

At step 224, the DPS determines that the action timestamp has not passed. For example, in response to receiving the identification of the Decision Maker computing device, DPS 100 may compare the action timestamp with a then-current timestamp. The then-current timestamp may be supplied by a system clock running on DPS 100. If DPS 100 determines that the then-current timestamp is after the action timestamp, DPS 100 may update data records to include the identified "Decision Maker" for the document. On the other hand, as the time limited offer has lapsed, DPS 100 may be programmed or configured to not continue with steps 226-228 if the action timestamp has passed.

In an embodiment, in response to determining that the action timestamp has passed, DPS 100 removes the data identifying the action and action timestamp from the document and/or the message. For example, DPS 100 may generate a new invoice that contains the initial payment amount term, but does not contain the time limited early payment discount offer. Additionally and/or alternatively, DPS 100 may identify in the document that the action timestamp has passed. For example, a second payment amount associated with the time limited early payment discount offer may be crossed out as an indication that the offer has lapsed. Additionally, DPS 100 may remove any metadata identifying the time limited early payment discount offer from the document and/or update stored data records to indicate that the time limited early payment discount offer has lapsed. By updating the metadata/data records, DPS 100 is able to avoid making the same determination multiple times.

In an embodiment, in response to determining that the action timestamp has passed, DPS 100 places the document into a separate processing queue. For example, in order to increase the likelihood of performance of the action, DPS 100 may place documents with data identifying an action and action timestamp into an expedited processing queue. Documents in the expedited processing queue may be receive earlier processing, such as earlier sending to other destinations. If DPS 100 determines that the action timestamp has passed, the document may be removed from the expedited processing queue so that documents with data identifying actions that are still actionable may be processed first.

At step 226, the DPS sends the document associated with the data identifying the action and the action timestamp to a second destination computing device. For example, in response to determining that the action timestamp has not passed, DPS 100 may use any of the methods described herein to send the document, along with the data identifying the action and action timestamp, to second destination computing device 206. In an embodiment, DPS 100 expedites sending documents to a second destination device in response to determining that the action timestamp is within a threshold period of time from the then-current timestamp. For example, if the action timestamp is within a day of the then-current timestamp, DPS 100 may cause the document to be sent immediately to the second destination device. In addition, DPS 100 may indicate that the document contains an upcoming due date, such as by using a visual indicator to mark the message as "urgent."

At step 228, the second destination computing device sends data indicating performance of the action to the DPS. As an example, the document may include a selectable option for indicating acceptance of the time-limited early payment discount offer. Upon receiving a selection of the selectable option, second destination computing device 206 may send data to DPS 100 indicating acceptance of the offer. The data may be sent through a procurement management application executing on second destination computing device 206. Additionally and/or alternatively, the selectable option may be a URL that, upon selection, causes second destination computing device 206 to access a website hosted by DPS 100 and/or to send data to DPS 100 indicating selection of the option.

Additionally and/or alternatively, data may be sent to DPS 100 indicating performance of the action in response to an indication that the second destination computing device has actually performed the action. For example, if the action is the time-limited early payment discount offer, DPS 100 may provide a user interface through a procurement management application for processing a payment to second destination computing device 206. If the action timestamp has not passed, DPS 100 may include, in the user interface executing on second destination computing device 206, an option for paying the discount offer amount. Thus, second destination computing device 206 communicates completion of the payment process through the procurement management application executing on second destination computing device 206.

At step 230, the terms of the document are updated to indicate performance of the action associated with the document. For example, in response to receiving a selection of the time-limited early payment discount offer, DPS 100 may update the terms of the invoice to identify a lower payment amount due. Updating the document may include updating data records of DPS 100 to indicate changes to the document based on performance of the action as well as updating the document received by second destination computing device 206. For example, if the document is sent through a procurement management application managed by DPS 100, DPS 100 may modify the document that is viewed through the procurement management application. DPS 100 may replace the document sent to second destination computing device 206 with an updated document comprising updated terms. Thus, to the perspective of a user of second destination computing device 206, the same document, on subsequent viewings, would contain the new terms dictated by the performance of the action.

Security Check for Automatic Processing

In an embodiment, DPS 100 determines whether to automatically process the document or to place the document in a processing queue for manual processing. Processing the document may comprise charging an account for a particular payment method. Additionally and/or alternatively, processing the document may comprise updating terms of the document to indicate that the action has been performed in the document prior to the action timestamp. Thus, if DPS 100 determines that a document is to be placed in the manual processing queue, DPS 100 may not immediately store data indicating performance of the action. Additionally, DPS 100 may not update the terms within the document until the document has been manually processed.

In an embodiment, DPS 100 makes the determination to automatically or manually process the document based on data associated with the destination identified by the first destination computing device. For example, in a first scenario, a first destination computing device executes a procurement management application. The account associated with the first destination computing device is associated with a first entity. Through the application, the first destination computing device identifies a different account as the "Decision Maker." If the identified account is also associated with the first entity or has been previously authorized to process invoices for the first entity, DPS 100 may select the invoice for automatic processing. If the identified account is a new account, is not authorized to process invoices for the first entity, and/or is not associated with the first entity, DPS 100 may select the invoice for manual processing.

As another example, accounts with the procurement management application may be associated with email addresses of the users. Thus, DPS 100 may use the email addresses to determine whether to manually or automatically process the invoice. For example, DPS 100 may determine whether the domain name for an email address associated with the identified account matches one or more domain names of identified users that are authorized for the invoice document. If the domain name matches one or more of the domain names for authorized users, DPS 100 may automatically process invoice. If the domain name does not match any of the domain names of authorized users, DPS 100 may manually process the invoice. This method also allows a user of the procurement management system to identify the second destination computing device through email addresses instead of account information. Even if the user of the second destination computing device does not have an account with the procurement management system, DPS 100 may still automatically process the invoice as long as the domain name of the identified email address matches the domain name of the email address associated with any of the authorized destination accounts, such as the destination account associated with the first destination computing device.

Exemplary Embodiment

Figure 4:
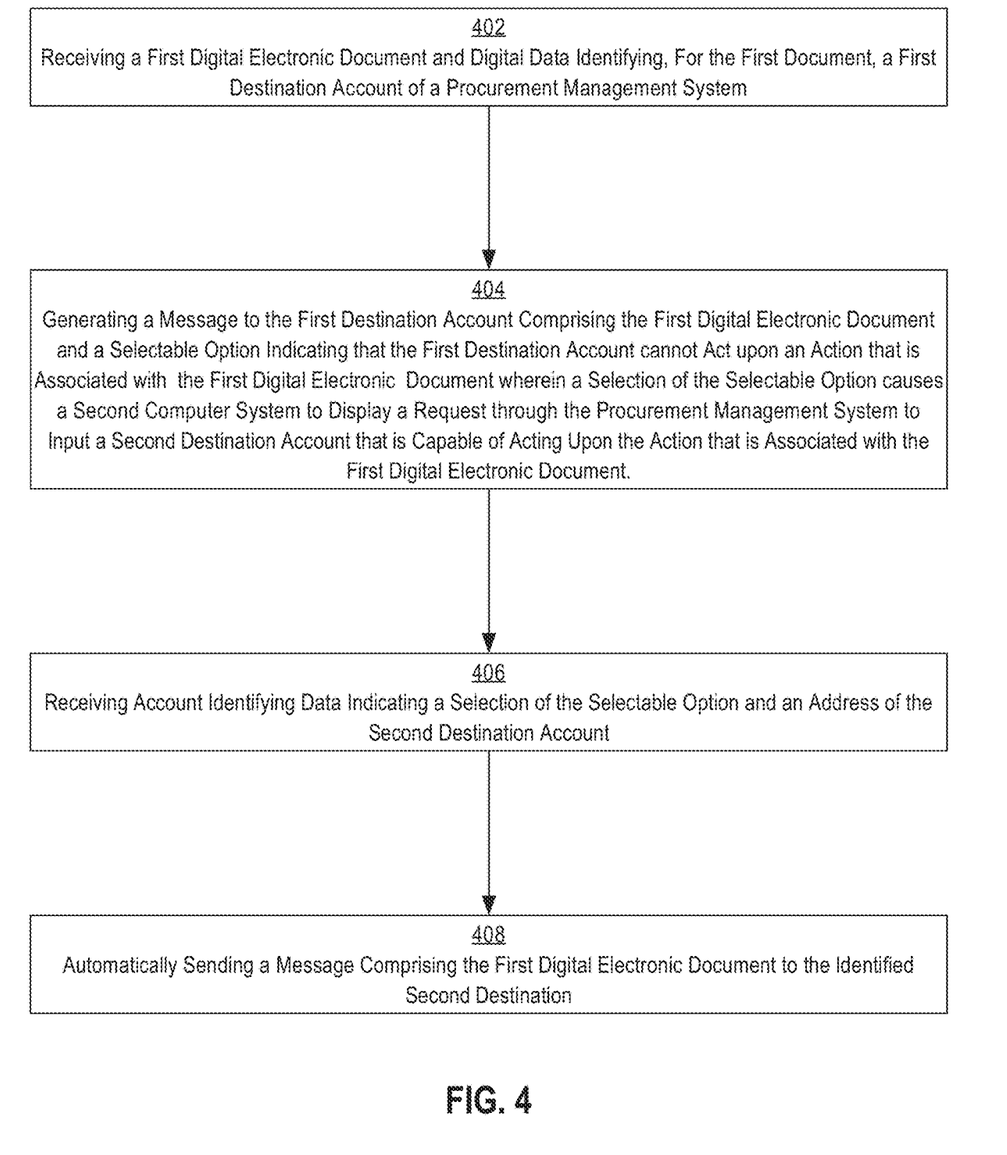
FIG. 4 depicts an exemplary embodiment of the methods described herein using a procurement management system.

FIG. 4 depicts an exemplary embodiment of the methods described herein using a procurement management system. Other embodiments may include use of messaging system, such as email, to perform the methods described herein. The particular embodiment depicted in FIG. 4 overcomes difficulties in providing documents to the right location through a procurement management system where users interact with the procurement management system while generally not interacting with each other through the system.

At step 402, a first digital electronic document and digital data identifying, for the first digital electronic document, a first destination account of a procurement management system is received. For example, a user may generate an invoice through the procurement management system and identify one or more accounts to receive the invoice. Additionally and/or alternatively, a digital processing system (DPS) may generate an invoice from a work order and designate the account that generated the work order as the first destination account.

At step 404, a message to the first destination account is generated comprising the first document and a selectable option indicating that the first destination account cannot act upon an action associated with the first document. A selection of the selectable option causes a second computer system to display a request through the procurement management system to input a second destination account that is capable of acting upon the action that is associated with the first document. For example, the digital processing system (DPS) may identify a time-limited early payment discount offer associated with a generated and/or received invoice. The DPS may display the invoice on the second computing device through the procurement management application along with data identifying the time-limited early payment discount offer and the due date for accepting the offer.

Additionally, the DPS may prompt the user of the first destination account to indicate whether the user is capable of accepting the time-limited early payment discount offer. If the user is not authorized to pay the invoice, the user may select an option indicating that the user is not capable of accepting the time-limited early payment discount offer. Upon receiving the indication that the user cannot act upon the action associated with the document, the second computing device displays, through the procurement management system, a request to identify an account of a user that is authorized to accept the offer/process the invoice.

At step 406, account identifying data indicating a selection of the selectable option and an address of the second destination account is received. For example, the DPS may receive the account identifying information through a user interface of the procurement management application executing on the second computing device.

At step 408, a message comprising the first digital electronic document is automatically sent to the second destination account. For example, the DPS may be configured to automatically send messages along with invoice documents to the input destination account. The method allows for faster automatic sending of documents within a procurement management system so that the correct user is given as much time as possible to review and process received documents.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
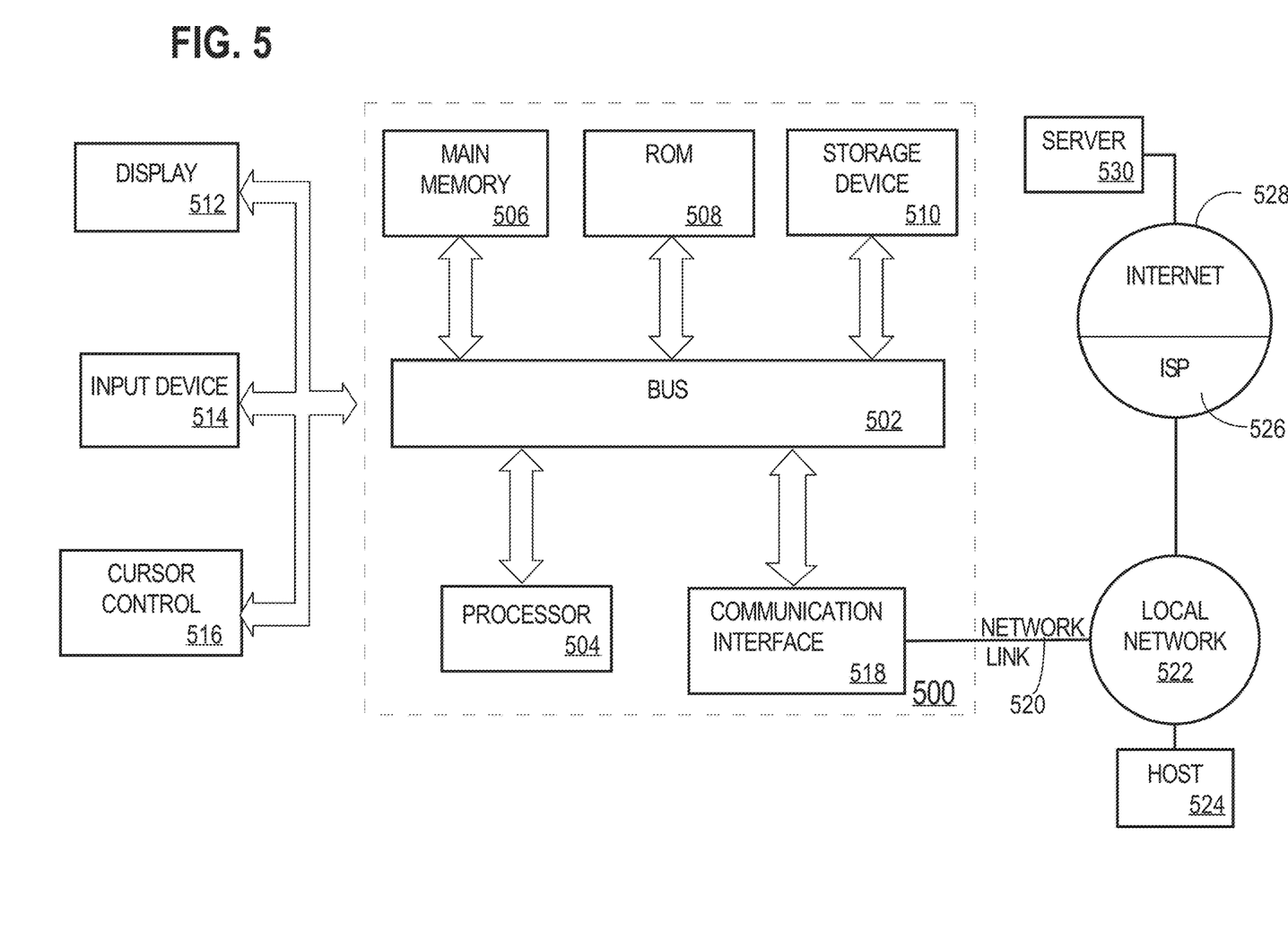
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
    receiving, at a first computer system executing a procurement management system, a first digital electronic document and account identifying data identifying, for the first digital electronic document, a first destination account of the procurement management system, the first digital electronic document indicating a first amount and an offer for a second amount conditioned on payment of the second amount by a specific time, the specific time being specified within metadata associated with the first digital electronic document;
    generating, at the first computer system, through the procurement management system, a message to the first destination account associated with a first user, the message comprising the first digital electronic document and a first selectable option indicating that the first destination account is not authorized to take an action that is associated with the first digital electronic document;
    storing, at the first computer system, an ordered approval chain list comprising a plurality of destination accounts ordered based on a likelihood of being authorized to act upon a digital electronic document, the likelihood being determined based on a number of digital electronic documents received and processed by each of the plurality of destination accounts;
    wherein a selection of the first selectable option indicating that the first destination account is not authorized to take the action that is associated with the first digital electronic document causes a second computer system to display, through the procurement management system, the ordered approval chain list comprising the plurality of destination accounts and a request to input a second destination account that is authorized to take the action associated with the first digital electronic document, the second destination account being associated with a second user different from the first user;
    receiving, at the first computer system, account identifying data indicating a selection of the first selectable option and identifying the second destination account for the first digital electronic document;
    determining, in response to receiving the account identifying data identifying the second destination account that is authorized to take the action associated with the first digital electronic document, that the specific time associated with the offer for the second amount has not lapsed;
    automatically sending, after determining that the specific time associated with the offer for the second amount has not lapsed, from the first computer system to the second destination account, a message comprising the first digital electronic document and a second selectable option to take the action;

receiving, at the first computer system, data indicating a selection of the second selectable option to take the action;

automatically generating and storing an updated copy of the first digital electronic document indicating that the second amount conditioned on payment of the second amount by the specific time was selected;

wherein the method is performed by one or more computing devices.

2. The method of claim 1, further comprising:

identifying, at the first computer system, an action timestamp associated with the first digital electronic document;

including, with the first digital electronic document, an option to perform an action associated with the action timestamp only when a then-current time is earlier than the action timestamp.

3. The method of claim 1, the first digital electronic document being an invoice, and the method further comprising:

storing, at the first computer system, for each of a plurality of destination accounts, account identifying data identifying the destination account;

determining that a particular portion of the account identifying data identifying the second destination account matches a particular portion of the account identifying data identifying a particular destination account of the plurality of destination accounts and, in response, automatically updating a payment term in the invoice.

4. The method of claim 3, wherein the particular portion of the account identifying data identifying the second destination account is a domain name of an email address.

5. The method of claim 1, further comprising:

storing, at the first computer system, for each of a plurality of destination accounts, account identifying data identifying the destination account;

determining that a particular portion of the account identifying data identifying the second destination account does not match a particular portion of the account identifying data associated with each of the plurality of destination accounts and, in response, sending the first digital electronic document to a manual processing queue.

6. The method of claim 1, wherein the first selectable option indicating that the first destination account is not authorized to take the action is a popup notification provided to the first destination account.

7. The method of claim 1, further comprising:

storing, at the first computer system, data linking the first destination account to the second destination account;

receiving, at the first computer system, a second digital electronic document and account identifying data for the second digital electronic document identifying the first destination account;

based on the stored data linking the first destination account to the second destination account, automatically sending the second digital electronic document to the second destination account.

8. A digital processing system comprising:

one or more hardware processors;

a digital electronic memory that is communicatively coupled to the one or more hardware processors and programmed to perform:

receiving, at the digital processing system executing a procurement management system, a first digital electronic document and account identifying data identifying, for the first digital electronic document, a first destination account of the procurement management system, the first digital electronic document indicating a first amount an offer for a second amount conditioned on payment of the second amount by a specific time, the specific time being specified within metadata associated with the first digital electronic document;

generating, at the digital processing system, through the procurement management system, a message to the first destination account associated with a first user, the message comprising the first digital electronic document and a first selectable option indicating that the first destination account is not authorized to take an action that is associated with the first digital electronic document;

storing, at the digital processing system, an ordered approval chain list comprising a plurality of destination accounts ordered based on a likelihood of being authorized to act upon a digital electronic document, the likelihood being determined based on a number of digital electronic documents received and processed by each of the plurality of destination accounts;

wherein a selection of the first selectable option indicating that the first destination account is not authorized to take the action that is associated with the first digital electronic document causes a second computer system to display, through the procurement management system, the ordered approval chain list comprising the plurality of destination accounts and a request to input a second destination account that is authorized to take the action that is associated with the first digital electronic document, the second destination account associated with a second user different from the first user;

receiving, at the digital processing system, account identifying data indicating a selection of the selectable option and identifying the second destination account for the first digital electronic document;

determining, in response to receiving the account identifying data identifying the second destination account that is authorized to take the action associated with the first digital electronic document, that the specific time associated with the offer for the second amount has not lapsed;

automatically sending, after determining that the specific time associated with the offer for the second amount has not lapsed, from the digital processing system to the second destination account, a message comprising the first digital electronic document and a second selectable option to take the action;

receiving, at the digital processing system, data indicating a selection of the second selectable option to take the action;

automatically generating and storing an updated copy of the first digital electronic document indicating that the second amount conditioned on payment of the second amount by the specific time was selected.

9. The digital processing system of claim 8, the digital electronic memory being further programmed to perform:

identifying, at the digital processing system, an action timestamp associated with the first digital electronic document;

including, with the first digital electronic document, an option to perform an action associated with the action timestamp only when a then-current time is earlier than the action timestamp.

10. The digital processing system of claim 8, the first digital electronic document being an invoice, and the digital electronic memory being further programmed to perform:

storing, at the digital processing system, for each of a plurality of destination accounts, account identifying data identifying the destination account;

determining that a particular portion of the account identifying data identifying the second destination account matches a particular portion of the account identifying data identifying a particular destination account of the plurality of destination accounts and, in response, automatically updating a payment term in the invoice.

11. The digital processing system of claim 10, wherein the particular portion of the account identifying data identifying the second destination account is a domain name of an email address.

12. The digital processing system of claim 8, the digital electronic memory being further programmed to perform:

storing, at the digital processing system, for each of a plurality of destination accounts, account identifying data identifying the destination account;

determining that a particular portion of the account identifying data identifying the second destination account does not match a particular portion of the account identifying data associated with each of the plurality of destination accounts and, in response, sending the first digital electronic document to a manual processing queue.

13. The digital processing system of claim 8, wherein the first selectable option indicating that the first destination account is not authorized to take the action is a popup notification provided to the first destination account.

14. The digital processing system of claim 8, the digital electronic memory being further programmed to perform:

storing, at the digital processing system, data linking the first destination account to the second destination account;

receiving, at the digital processing system, a second digital electronic document and account identifying data for the second digital electronic document identifying the first destination account;

based on the stored data linking the first destination account to the second destination account, automatically sending the second digital electronic document to the second destination account.

\* \* \* \* \*